United States Patent
Herzinger et al.

(10) Patent No.: US 9,873,186 B2
(45) Date of Patent: Jan. 23, 2018

(54) CONNECTING ELEMENT

(71) Applicant: Bayerische Motoren Werke Aktiengesellschaft, Munich (DE)

(72) Inventors: Thomas Herzinger, Munich (DE); Sonja Wolf, Munich (DE); Johann van Niekerk, Munich (DE); Matthias Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/169,852

(22) Filed: Jan. 31, 2014

(65) Prior Publication Data
US 2014/0147195 A1 May 29, 2014

Related U.S. Application Data

(63) Continuation of application No. PCT/EP2012/063536, filed on Jul. 11, 2012.

(30) Foreign Application Priority Data

Aug. 3, 2011 (DE) .......................... 10 2011 080 317

(51) Int. Cl.
*F16B 5/00* (2006.01)
*B25B 5/00* (2006.01)
(Continued)

(52) U.S. Cl.
CPC ................ *B25B 5/00* (2013.01); *B23K 31/02* (2013.01); *C09J 5/00* (2013.01); *F16B 5/065* (2013.01);
(Continued)

(58) Field of Classification Search
CPC .......... F16B 5/0664; F16B 5/08; F16B 21/07; F16B 21/071; F16B 21/082; F16B 5/065;
(Continued)

(56) References Cited

U.S. PATENT DOCUMENTS

| 409,744 A | * | 8/1889 | Garben | ................ A63H 33/042 446/104 |
| 2,094,529 A | * | 9/1937 | Fisher | ....................... B44C 5/02 211/105.1 |

(Continued)

FOREIGN PATENT DOCUMENTS

| CN | 101400902 A | 4/2009 |
| CN | 201692659 U | * 1/2011 ........... A63H 33/062 |

(Continued)

OTHER PUBLICATIONS

Chinese Office Action issued in counterpart Chinese Application No. 201280023118.5 dated Dec. 31, 2015 with English translation (seven pages).

(Continued)

*Primary Examiner* — Matthieu F Setliff
*Assistant Examiner* — Matthew R McMahon
(74) *Attorney, Agent, or Firm* — Crowell & Moring LLP

(57) ABSTRACT

A connection element is provided for connecting at least two components. The connection element has at least two spherical, sphere-shaped or sphere-type or sphere-like sections, wherein a first section of the at least two sections is provided for the connection with a first component, and the second section of the at least two sections is provided for the connection with a second component.

8 Claims, 2 Drawing Sheets

(51) Int. Cl.
   *B23K 31/02* (2006.01)
   *C09J 5/00* (2006.01)
   *F16B 5/06* (2006.01)
   *F16B 5/08* (2006.01)
   *F16B 21/08* (2006.01)

(52) U.S. Cl.
   CPC .............. *F16B 5/0664* (2013.01); *F16B 5/08* (2013.01); *F16B 21/082* (2013.01); *C09J 2400/163* (2013.01); *Y10T 24/44* (2015.01); *Y10T 29/49876* (2015.01); *Y10T 403/70* (2015.01)

(58) Field of Classification Search
   CPC .. F16B 5/0642; F16B 5/0657; Y10T 403/342; Y10T 403/347; Y10T 403/471; Y10T 24/44; A63H 33/062; E04B 1/1906; E04B 2001/1927; B23K 2201/006; B23K 31/02
   See application file for complete search history.

(56) References Cited

U.S. PATENT DOCUMENTS

| | | | | |
|---|---|---|---|---|
| 2,275,900 | A | | 3/1942 | Hall |
| 3,148,310 | A | * | 9/1964 | Feldman ................ H05K 1/112 174/265 |
| 3,367,082 | A | | 2/1968 | Meyer |
| 3,597,874 | A | * | 8/1971 | Ogsbury .............. A63H 33/065 446/104 |
| 3,648,404 | A | * | 3/1972 | Ogsbury et al. .............. 446/126 |
| 3,747,261 | A | * | 7/1973 | Salem ........................... 446/104 |
| 3,822,499 | A | * | 7/1974 | De Vos ......................... 446/121 |
| 4,120,641 | A | * | 10/1978 | Myles ............................... 432/3 |
| 4,408,708 | A | | 10/1983 | Delcour |
| 4,471,595 | A | * | 9/1984 | Lanzafame ..................... 52/836 |
| 4,617,001 | A | * | 10/1986 | Parein ........................... 446/102 |
| 4,766,712 | A | * | 8/1988 | Hale ............................... 52/645 |
| 4,866,902 | A | * | 9/1989 | Arciszewski ......... E04B 1/1906 403/171 |
| 5,067,848 | A | * | 11/1991 | Hiigli .................... A63H 33/10 24/586.11 |
| 5,473,955 | A | * | 12/1995 | Stinson .................... B60S 1/24 15/250.27 |
| 5,645,464 | A | * | 7/1997 | Chen .............................. 446/120 |
| 5,680,792 | A | * | 10/1997 | Buhl ........................ B60S 1/24 15/250.31 |
| 5,752,869 | A | * | 5/1998 | Huff ........................ A63H 3/16 446/102 |
| 5,823,065 | A | * | 10/1998 | Egner-Walter ............ B60S 1/24 15/250.3 |
| 6,109,999 | A | * | 8/2000 | Kuo .............................. 446/236 |
| 6,220,919 | B1 | * | 4/2001 | Cheng ........................ A63F 9/12 273/153 P |
| 6,264,522 | B1 | * | 7/2001 | Dickson ........................ 446/120 |
| 6,463,759 | B1 | * | 10/2002 | Garcia et al. ..................... 63/38 |
| 7,354,330 | B2 | * | 4/2008 | Bentley, Jr. .................... 446/102 |
| 7,798,884 | B2 | * | 9/2010 | Barcelo ......................... 446/124 |
| 8,262,333 | B2 | | 9/2012 | Buecker et al. |
| 2006/0140710 | A1 | * | 6/2006 | Egner-Walter ............ B60S 1/24 403/122 |
| 2008/0003917 | A1 | * | 1/2008 | Norman .................... A63F 9/08 446/97 |
| 2008/0108274 | A1 | * | 5/2008 | Cheng ........................ A63F 3/00 446/120 |
| 2008/0261484 | A1 | | 10/2008 | Culpepper |
| 2009/0298382 | A1 | * | 12/2009 | Ochi ..................... A63H 33/086 446/121 |
| 2011/0028063 | A1 | * | 2/2011 | Colangelo ............ A63H 33/062 446/120 |
| 2013/0102220 | A1 | * | 4/2013 | Wang ................... A63H 33/062 446/102 |

FOREIGN PATENT DOCUMENTS

| | | | |
|---|---|---|---|
| DE | 31 14 015 A1 | 1/1982 | |
| DE | 32 32 926 A1 | 3/1984 | |
| DE | 4400296 A1 * | 7/1995 | ............... B60S 1/24 |
| EP | 1 577 567 A1 | 9/2005 | |
| EP | 1 596 076 A1 | 11/2005 | |

OTHER PUBLICATIONS

Chinese Office Action issued in counterpart Chinese Application No. 201280023118.5 dated Jun. 29, 2016, with English translation (thirteen (13) pages).

* cited by examiner

CONNECTING ELEMENT

CROSS REFERENCE TO RELATED APPLICATIONS

This application is a continuation of PCT International Application No. PCT/EP2012/063536, filed Jul. 11, 2012, which claims priority under 35 U.S.C. §119 from German Patent Application No. DE 10 2011 080 317.3, filed Aug. 3, 2011, the entire disclosures of which are expressly incorporated by reference herein.

This application contains subject matter related to U.S. application Ser. No. 14/169,897, entitled "Method of Connecting Two Components as well as a Component Connection," filed on even date herewith.

BACKGROUND AND SUMMARY OF THE INVENTION

The present invention relates to a connection element for connecting at least two components.

In the large-scale production of vehicle bodies, a plurality of vehicle parts have to be positioned relative to one another with high precision and repetitive accuracy, and subsequently be connected with one another, for example, by welding, bolting, gluing, clipping, or the like.

It is an object of the invention to create a connection element which can be used in a versatile manner, particularly in the construction of vehicle bodies, and by which two or more components can be mutually connected in a simple and cost-effective fashion.

This and other objects are achieved by a connection element for connecting at least two components, wherein the connection element has at least two spherical, sphere-shaped, sphere-type or sphere-like sections. A first section of the at least two sections is provided for the connection with a first component, and the second section of the at least two sections is provided for the connection with a second component.

The starting point of the invention is a connection element for connecting at least two components, which has at least two convex or spherical, sphere-type or sphere-like "connection" sections, in which case, a first section of the at least two sections is provided for the connection with a first component, and the second section of the at least two sections is provided for the connection with a second component.

As used herein, the term "spherical" includes "sphere-type" or "sphere-like," or all convex shapes which are at least approximately similar to the shape of a sphere. Of course it may also (in a mathematical sense) include true spheres, spherical caps or parts of spheres.

The connection element, including its spherical, sphere-type or sphere-like sections may consist, for example, of metal, particularly of steel or aluminum or of a synthetic material.

In contrast to conventional connection elements, which have connection sections having a shape that deviates from a spherical shape (for example, threaded bolts, or the like), a connection element according to the present invention can be produced in a very simple and cost-effective manner from mass-produced individual spheres, which only have to be connected with one another. The connection of the individual spheres for forming a connection element can take place, for example, by welding.

Components can be directly form-lockingly and/or in a frictionally engaged manner fitted or clipped onto the at least two (connection) sections.

As an alternative, a clipping element can be fitted or clipped in a form-locking and/or frictionally engaged manner on one or more of the existing sections of the connection element, which clipping element is, in turn, connected with one of the components to be mutually connected. In this case, the at least two components to be mutually connected are therefore not mutually connected directly by way of the connection element but by way of the connection element and at least one clipping element.

It may be provided that the spherical, sphere-type or sphere-like sections are arranged directly in line or are arranged directly following one another, i.e. "in one row" behind one another. This means that an additional (spacer) section, which has a different shape, does not necessarily have to be provided between the individual sections. In particular, several spheres can be arranged directly in a row and can be connected with one another, for example, in a material-locking manner, particularly by welding.

A connection element according to the invention may specifically have precisely to spherical, sphere-type or sphere-like sections. The two "spheres" can be welded directly to one another.

As an alternative, a connection element may also have three or more spherical, sphere-type or sphere-like sections. In the case of three or more such sections, these can be arranged, for example, in a row behind one another, i.e. in an aligned fashion.

As an alternative, the connection element may also be constructed in the form of a "connection node". The individual connection sections of the connection element therefore do not all have to be arranged in a line behind one another. They may also be arranged differently, for example, in a star-shaped, cross-shaped or in another manner and be mutually connected to form the connection element. It may, for example, be provided that at least two of the spherical, sphere-type or sphere-like connection sections are arranged behind one another and that at least one additional spherical, sphere-type or sphere-like section is arranged laterally with respect to the at least two spherical, sphere-type or sphere-like sections arranged behind one another.

The invention naturally comprises not only the above-described connection element per se but also component connections which have two or more components mutually connected with one another by way of a connection element according to the invention.

As initially mentioned, the components may, for example, be body components of a vehicle body. The vehicle body components do not necessarily have to be metal components. On the contrary, the invention is also generally suitable for the connection of almost any components, particularly for the connection of synthetic components, fiber-reinforced synthetic components (composite fiber components), etc.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
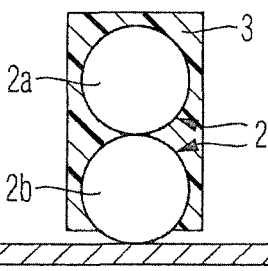
FIG. 1 is a schematic illustration of a first embodiment according to the invention.

FIG. 1 illustrates a blank-type component, for example, a vehicle body plate 1, which is connected by way of a connection element 2 with a (here, extremely schematically shown) second component 3. The connection element 2 is formed here by two mutually connected, for example, mutually welded-together, spheres 2a, 2b. The connection section 2b is directly connected here with the component 1. It may be welded or glued onto the component 1 or connected therewith in a different manner.

The spheres 2a, 2b form "connection" sections of the connection element 2. As illustrated in FIG. 1, the connection sections 2a, 2b are directly connected with one another; i.e. no additional component has to be arranged as a "spacer" between the connection elements 2a, 2b.

The second component 3 is constructed here as a "clipping element". It may partially or completely be made of a synthetic material. It is important that this clipping element has a sufficiently high elasticity, so that it can be clipped onto the connection sections 2a, 2b of the connection element 2.

In principle, the second component 3 could also be constructed in two or more parts. In this case, the individual parts of the component 3 could be applied to the connection sections 2a, 2b from the side and could be "fitted together" to form the second component, which would have the advantage that the second component 3 can have a comparatively, low elasticity.

Figure 2:
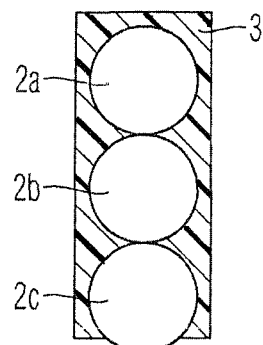
FIG. 2 is a schematic illustration of a second embodiment according to the invention.

FIG. 2 illustrates an embodiment with a connection element which has three spherical connection sections 2a, 2b 2c, which are arranged behind one another in a linear manner. The connection sections 2a, 2b, 2c are spheres which are welded to one another or otherwise connected with one another. Here, the clipping element 3 is clipped onto to all three connection sections 2a, 2b, 2c.

In principle, the connection element could also be produced in one piece with its connection sections 2a, 2b, 2c. In the case of a steel component, the connection sections 2a, 2b, 2c may also be turned "from solid material". As an alternative, the connection element could also be produced as an injection-molded part of a synthetic material.

Figure 3:
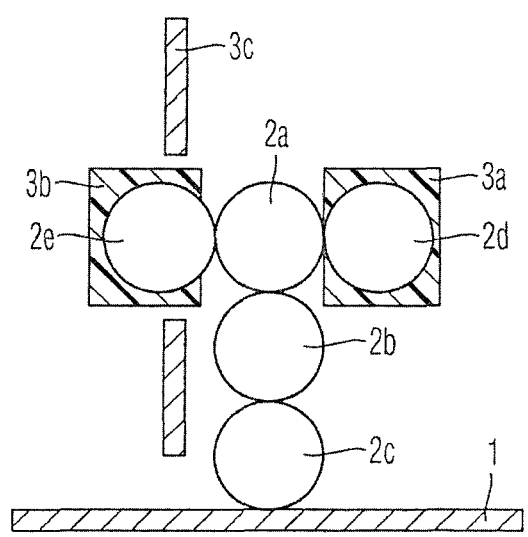
FIG. 3 is a schematic illustration of a third embodiment according to the invention.

FIG. 3 illustrates an embodiment with a connection element which has five connection sections 2a-2e. Analogous to the embodiment of FIG. 2, the three connection sections 2a-2c are arranged in a row behind one another, in which case, the two connection sections 2a and 2c are, for example, material-lockingly connected with the connection section 2b. The two connection sections 2c, 2d are connected on mutually opposite sides of the connection section 2a with the latter. The connection sections 2a-2d thereby form a T-shaped connection element which has the function of a connection node.

The connection element 2c may, for example, be welded onto the metal plate 1. One clipping element 3a, 3b may, in each case, be clipped onto the connection sections 2d-2e, the clipping element 3b being connected in a manner not shown here in detail with an additional component 3c. The clipping element 3b may, for example, be form-lockingly engaged in a recess which is provided in the component 3c.

Figure 4:
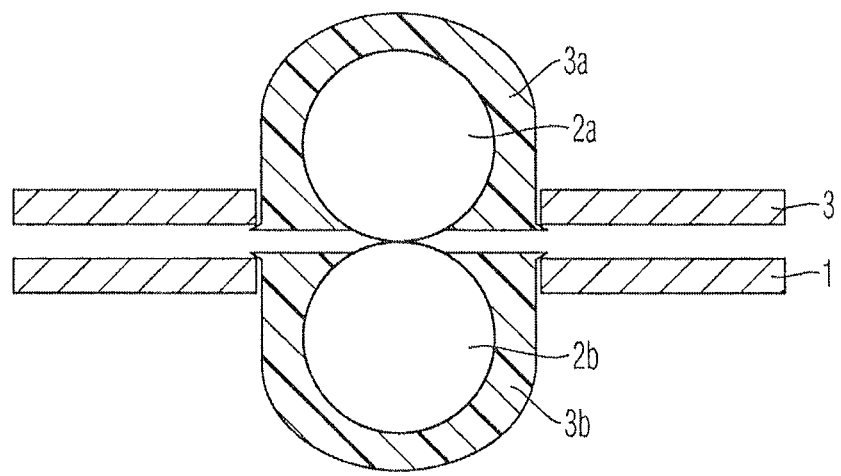
FIG. 4 is a schematic illustration of a fourth embodiment according to the invention.

FIG. 4 illustrates an embodiment in which a connection element is used that has the shape of a double sphere. The connection element has two connection sections 2a, 2b each formed by a sphere, which may, for example, be welded to one another. A first clipping element 3a is clipped over the connection section 2a, and a second clipping element 3b is clipped over the connection section 2b. The clipping element may, for example, be produced of a synthetic material.

The connection element formed by the two connections sections 2a, 2b penetrates two components 1, 3. For this purpose, one passage hole, respectively, is provided in the two components 1, 3. The clipping elements 3a, 3b each reach behind the edges of the holes provided in the two components 1, 3, whereby the two components 1, 3 can be clamped together. The two clipping elements 3a, 3b may be inserted in a form-locking or frictionally engaged manner in the holes provided in the two components 1, 3, which is not shown in detail in FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
   a first component and a second component mutually connected by way of a connection element, the first component having a longitudinal shape that extends along a first direction and the second component having a longitudinal shape that extends along a second direction that is perpendicular to the first direction,
   wherein the connection element comprises:
   a plurality of solid spheres directly welded to one another at respective spherical surfaces thereof, free surfaces of the plurality of solid spheres being completely spherical, wherein
   the plurality of solid spheres define a connection node having a t-shape formed by a first sphere, a second sphere, a third sphere, a fourth sphere, and a fifth sphere,
   the t-shape of the connection node being formed by the first sphere, the second sphere, and the third sphere arranged linearly one behind another along the second direction, and the fourth sphere and the fifth sphere being laterally welded to opposite sides of the third sphere, wherein
   the first sphere is welded to the first component, and
   the fourth sphere is connected to the second component via a clipping element clipped on an exterior surface of the fourth sphere.

2. The component connection according to claim 1, wherein the connection element is made of steel or a synthetic material.

3. The component connection according to claim 1, wherein the clipping element is connectable in a form-locking and/or a frictionally engaging manner with the second component.

4. The component connection according to claim 1, wherein the connection element is made of metal.

5. The component connection according to claim 1, wherein the first component and the second component are vehicle body components.

6. The component connection according to claim 5, wherein at least one of the two vehicle body components is a composite fiber vehicle body component.

7. The component connection according to claim 1, wherein the first component and the second component are non-spherical.

8. The component connection according to claim 1, wherein each of the plurality of solid spheres has the same size.

* * * * *